United States Patent [19]

Hashimoto

[11] 4,294,519
[45] Oct. 13, 1981

[54] COLOR DENSITY STABILIZER FOR ELECTROCHROMIC DISPLAY

[75] Inventor: Sadakatsu Hashimoto, Nara, Japan

[73] Assignee: Sharp Kabushiki Kaisha, Osaka, Japan

[21] Appl. No.: 41,637

[22] Filed: May 23, 1979

[30] Foreign Application Priority Data

May 26, 1978 [JP] Japan ................ 53-64173

[51] Int. Cl.³ .................. G02F 1/17; 350 357
[52] U.S. Cl. .................. 350/357; 340/763; 340/785
[58] Field of Search . 350/357; 340/763, 785, 812, 813

[56] References Cited

U.S. PATENT DOCUMENTS

| | | | |
|---|---|---|---|
| 3,725,898 | 4/1973 | Canton | 340/763 |
| 4,045,791 | 8/1977 | Fukai et al. | 340/813 |
| 4,160,241 | 7/1979 | Shimizu et al. | 340/763 |
| 4,201,985 | 5/1980 | Inami et al. | 350/357 X |

Primary Examiner—James W. Davie
Attorney, Agent, or Firm—Birch, Stewart, Kolasch and Birch

[57] ABSTRACT

A control circuit is adapted in connection with a driving circuit useful for an electro-optical device such as an electrochromic display device including an optical element, e.g., an electrochromic material of which coloration properties depend on surrounding temperature. The control circuit comprises a heat-sensitive element such as a thermister positioned adjacent to the electro-optical device for detecting the surrounding temperature, the element having a temperature coefficient varying on temperature, a circuit responsive to the heat-sensitive element for providing output signals, and the driving circuit responsive to the output signals from the circuit for controlling time intervals for which driving signals from the driving circuit are applied to the electro-optical device, whereby coloration shades of the optical element are approximately uniformed.

9 Claims, 9 Drawing Figures

COLOR DENSITY STABILIZER FOR ELECTROCHROMIC DISPLAY

BACKGROUND OF THE INVENTION

The present invention relates to electro-optical displays of the type using electrochromic material which undergoes reversible color changes upon the application of an electric field.

More particularly, the present invention relates to a coloration uniforming circuit adapted for the electrochromic display to provide uniform coloration regardless of the surrounding temperature adjacent to the display.

There are two types of electrochromic displays referred to as ECDs hereinbelow. (See, for example, L. A. Goodman, "Passive Liquid Displays" RCA Report 613258). In one kind, the color variation is produced by the changes in the opacity of an inorganic solid film made of, e.g., $WO_3$, $MoO_3$ or the like. The second type of the ECDs utilizes an electrically-induced chemical reduction of a colorless liquid to produce a colored, insoluble film on the cathode surface.

In both of the above two types of the ECDs, the rate of coloration and erasure action considerably depends on the surrounding temperature since the coloration and erasure action is conduced according to electrochemical reactions. Especially, when constant voltage driving techniques are applied between display and counter electrodes of the ECD, the coloration and erasure action is variable according to the surrounding temperature. High temperatures accelerate the electrochemical reactions to thereby increase the color density.

In other words, non-uniformity in the coloration and erasure action inevitably occurred depending on the surrounding or atmospheric temperature inasmuch as a fixed voltage was applied to the electrodes for a constant time.

To make color density or shade constant, it might be possible to control the applied voltage pursuant to the surrounding temperature. However, high voltages may damage the electrochromic material. This technique of solving was therefore not practical.

OBJECTS AND SUMMARY OF THE INVENTION

Accordingly, it is the primary object of the present invention to provide an improved driving circuit adapted for use with an electrochromic display where uniform coloration density or depth of color of electrodes are assured.

It is a further object of the present invention to provide an improved driving circuit which controls the generation of driving signals applied to electrodes of an electrochromic display for coloration purposes pursuant to the surrounding temperature.

It is a further object of the present invention to provide an improved driving circuit useful for an electrochromic display, which is constructed so that the generation of driving signals applied to electrodes of the display is controlled in applied time intervals depending on the surrounding temperature of the display.

It is a further object of the present invention to provide an improved driving circuit including a heat-sensitive element adapted to control applied time intervals of driving signals which are impressed to electrodes of an electrochromic display, thereby keeping coloration shade or depth of color of the electrodes uniform.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to an embodiment of the present invention, a control circuit is adapted in connection with a driving circuit useful for an electrochromic display device including an electrochromic material of which the coloration properties are sensitive to the surrounding temperature.

The control circuit comprises a heat-sensitive element provided adjacent to the electrochromic display device for detecting the surrounding temperature, the element having a temperature coefficient varying on temperature, a circuit responsive to the heat-sensitive element for providing output signals, and the driving circuit responsive to the output signals from the circuit for controlling time intervals for which driving signals are applied from the driving circuit to the electrochromic display device so that the coloration shade or depth of color of the electrochromic material is approximately uniform.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

The present invention can be applied to any types of electrochromic displays (referred to as "ECD" hereinafter) inasmuch as electrochemical reactions are caused for coloration or bleaching operations, the rate of which is changed pursuant to the surrounding temperature of the ECD. The detailed description of ECD per se is omitted because the kind of the ECD is not concerned with the gist of the present invention.

Figure 1:
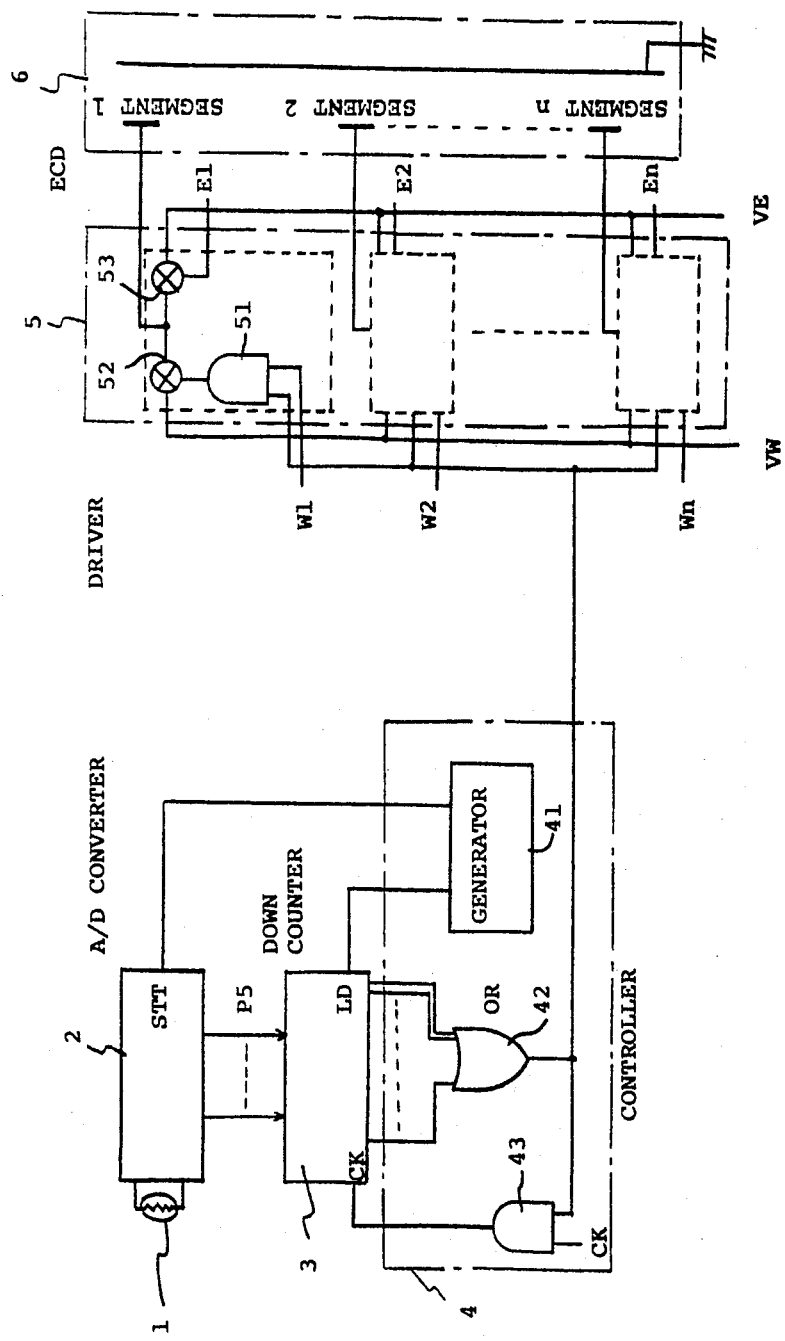
FIG. 1 is a block diagram of a coloration uniforming circuit according to the present invention including a driving circuit adapted for use of an electrochromic display.

FIG. 1 shows a circuit construction of a coloration uniforming circuit in accordance with the present invention. The coloration uniforming circuit comprises a heat-sensitive element 1, e.g., a thermistor, an A/D converter 2, a down counter 3, a controller 4, a driver 5, and an ECD 6.

The coloration uniforming circuit is specially adapted to control time intervals for which driving signals are applied from the driver 5 to the ECD 6.

Briefly speaking, the heat-sensitive element 1 disposed adjacent to the ECD 6 is adapted to detect the surrounding temperature of the ECD. The output of the element 1 is introduced to the A/D converter 2 to obtain digital information from analog information applied in the form of the variation of resistant value related to the surrounding temperature. The digital information is impressed into the down counter 3 to control the time intervals of the driving signals to be applied for coloration uniforming purposes in depth of color.

The present invention adapts the following principle related to the essential nature of the electrochromic material 1: Coloration time intervals of the electrochromic material for uniform depth of color are increased in proportion to a value of a parameter of $e^{\alpha/T}$ where $\alpha$ is a constant and T is an amount of absolute temperature. Therefore, uniform coloration shade or depth of color can be assured by changing the time intervals for which the driving signals are applied to electrodes connected to the electrochromic material, having a relationship defined by $e^{\alpha/T}$. The parameter of $e^{\alpha/T}$ can be detected by the heatsensitive element 1 comprising the thermister. The variation of resistance value R in the thermistor can be represented as follows:

$$R = Ae^{(\beta/T)}$$

where

A: a proportion quantity
$\beta$: the constant

When and if the thermister is selected to have the value of the constant $\beta$ approximately equivalent to the value of the constant $\alpha$, the variation of the resistance value of the thermister is directly proportional to the coloration time intervals for the electrochromic materail to be required.

The value of $\alpha$ is about 1500 to 1900. One of the thermisters which is commercially available by Hitachi, Ltd. under a model of TM 2300 has the value of 1610, for example.

It is not required that the thermister completely follow the temperature properties of the electrochromic material. And some appropriate element can be selected to be applied to the present coloration uniforming system.

The above-mentioned thermister has a negative temperature coefficient. Some positive temperature coefficient thermisters may be utilized for use with the present coloration uniforming system by modulating the A/C converter in an appropriate form.

With reference to FIG. 1, a generator 41 within the controller 4 is provided for generating signals applied to a terminal STT of the A/D converter so that analog information relevant to temperature adjacent to the heat-sensitive element 1 is converted to digital information. The down counter 3 is responsive to signals applied to a terminal LD therein from the generator 41 to accept the digital information.

The digital information entered into the down counter 3 is subsequently counted down at a predetermined time interval. The information of the down counter 3 is applied to the controller 4.

The controller 4 contain an OR gate 42, which accepts the information from the down counter 3. The OR gate 42 develops output signals of, e.g., a high level in response to the information from the down counter 3. The output signals from the OR gate 42 are introduced to the driver 5 to make AND gates 51 of the driver 5 conductive. The outout signals also cause an AND gate 43 to be conductive, thereby transferring clock signals to perform count down operations in the down counter 3. A predetermined value has been initially preset in the down counter 3, the value being selected so as to provide sufficient coloration shade by the electrochromic reactions. The count down operations are carried out at a constant rate from the preset value according to the clock signals to be applied from the AND gate 43.

When the counted information is being impressed into the OR gate 42, the respective AND gates 51 of the driver 5 and the AND gate 43 of the controller 4 are conductive. The driver 5 provides driving signals applied to segment electrodes in the ECD 6 for driving purposes. A plurality of segment signals are denoted as W1 to Wn and E1 to En. A writing voltage and erasing voltage are referred to as VW and VE, respectively. A predetermined constant voltage is applied to display and counter electrodes of the ECD 6 for coloration purposes.

Two switches such as transistors 52 and 53 are provided for controlling application of the writing voltage VW and the erasing voltage VE, respectively, to the segment electrodes of the ECD 6. The same driving elements comprising the AND gate 51 and the two switches 52 and 53 are connected to the relevant segment electrodes although the drawing is omitted.

When the contents of the down counter 3 become zero, the information is not delivered from the counter 3 so that the OR gate 42 does not develop the output signals. Then the respective AND gates 51 become nonconductive so that the driver 5 does not generate the driving signals thereafter. The AND gate 43 of the controller 4 becomes nonconductive, thereby restricting the application of the clock signals to the down counter 3.

According to the circuit construction mentioned above, the time intervals for which a constant voltage is applied to the electrodes in the ECD 6 can be controlled in such a manner as to be proportional to the resistance value of the heat-sensitive element 1 of the thermister. The coloration shade of the electrochromic material is then assured independent of the surrounding temperature amount of the ECD 6.

Since the electrochromic material, such as WO$_3$, has memory function, as is well known, the coloration shade of the ECD can be maintained in the absence of the applied voltage. By the application of a reverse polarity voltage, the electrochromic material become bleached.

Figure 2:
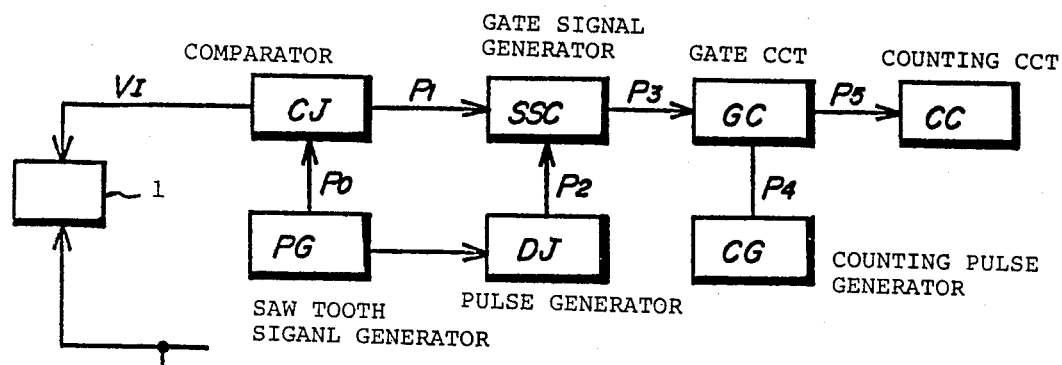
FIG. 2 is a block diagram of an A/D converter employed within the coloration uniforming circuit shown in FIG. 1.

FIG. 2 indicate a more detailed block diagram of the heat-sensitive element 1 and the A/C converter 2 of FIG. 2.

The A/D converter 2 comprises a saw tooth signal generator PG, a comparator CJ, a pulse generator DJ, a gate signal generator SSC, a counting pulse generation CG, a gate circuit GC, and a counting circuit CC. This circuit configuration per se is well known in the art.

Figure 3:
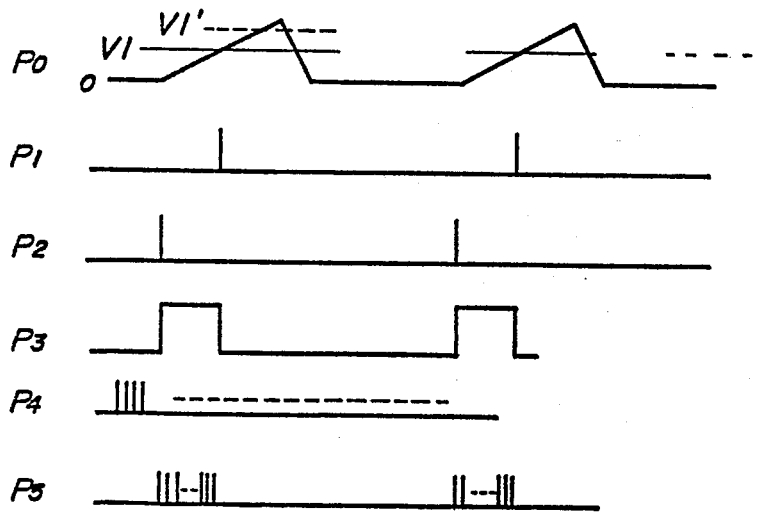
FIG. 3 is a time chart of signals occurring within the A/C converter shown in FIG. 2.

FIG. 3 shows a time chart of various signals occurring within the circuit of FIG. 2. The signals applied to the terminal STT of the A/D converter 2 as described in connection with FIG. 1 are to put the converter 2 in order for causing the circuit operations. A series of saw tooth signals PO are generated from the saw tooth signals generator PG. The comparator CJ, functions to compare the signals P0 with signals V1, applied from the heat-sensitive element 1. If the level of the signals VI is coincident with that of the signals P0, output signals P1 are developed from the comparator CJ to indicate the coincidence.

The pulse generator DJ generates pulse signals P2 in response to the generation of the saw tooth signals P0. The gate signal generator SSC delivers gate pulse signals P3 which has rising edge and falling edge in association with the generation of the pulse signals P2 and the output signals P1, respectively. The gate circuit GC accepts the gate pulse signals P3 to transfer pulse signals P4 to the counting circuit CC as signals P5 in so far as the gate pulse signals P3 are delivered. The pulse signals P4 are developed from the counting pulse generator CG.

The signals V1 from the heat-sensitive element 1 are concerned with the resistance value of the element 1. Therefore, the digital information related to the resistance value can be obtained in the form of the time length of a series of the signals P5 as shown in FIG. 3.

Figure 4:
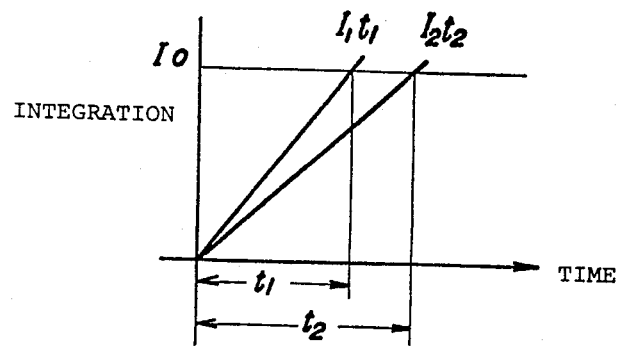
FIG. 4 is a graph showing the effect by integration of the applied current to explain the operating principle of a specific embodiment of the present invention.

With reference to FIG. 4, there is disclosed a relationship between applied current value and integration function thereon. As is apparent from the teaching of FIG. 4, amounts t1 and t2 of integration time required to reach the same integration value I0 are inversely proportional to values I1 and I2 of DC current. This fact is adapted for use of a further embodiment described below.

Figure 5:
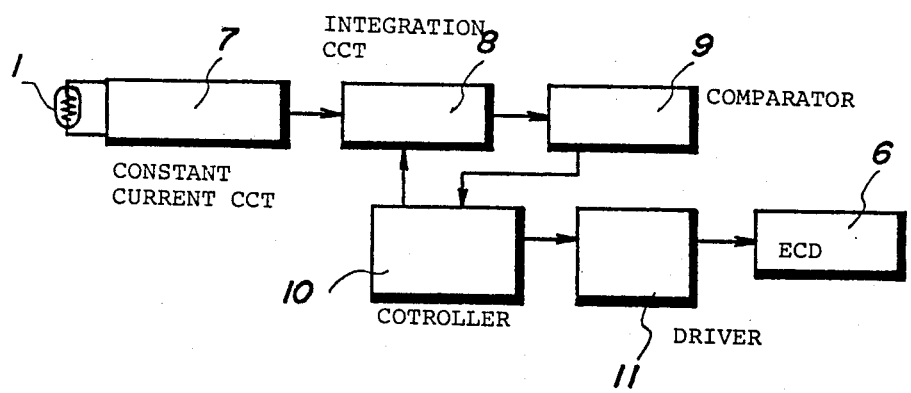
FIG. 5 is a block diagram of another specific coloration uniforming circuit according to the principle illustrated in FIG. 4.

FIG. 5 illustrates another coloration uniforming circuit of a further embodiment of the present invention. The coloration uniforming circuit of FIG. 5 comprises the afore-mentioned heat-sensitive 1, a constant current circuit 7, an integration circuit 8, a comparator 9, a controller 10, a driver 11, and the ECD 6. The controller 10 and the driver 11 are similar to the above-mentioned controller 4 and the driver 5, respectively, as mentioned in connection with FIG. 1. The ECD 6 is referred to the same of FIG. 1.

The heat-sensitive element 1 is positioned adjacent to the ECD 6. The output signals of the element 1 are entered into the constant current circuit 7. The constant current circuit 7 is so constructed as shown in FIG. 6.

Figure 6:
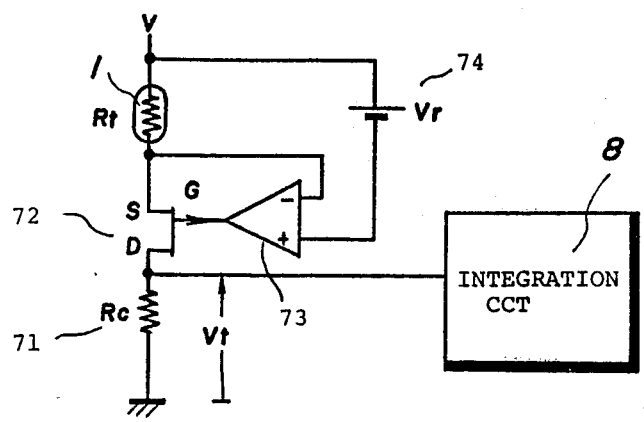
fIG. 6 is a more detailed circuit configuration of the coloration uniforming circuit depicted in FIG. 5.

Referring to FIG. 6, there are included within the circuit 7 a resistor 71 of RC, a switching transistor 72, an operational amplifier 73 and a power source 74, for example.

The circuit 7 is wired so that a value of current flowing through the resistor 71 is increased in association with the reduction of the resistance value of the element 1, which changes in accordance with the surrounding temperature. In other words, the current value of the resistor 71 is inversely proportional to the resistance value of the element 1. Therefore, a value of voltage between the resistor 71 and the ground is increased, which is detected by the integration circuit 8 for causing integration calculations.

Turning back to FIG. 5, output signals from the integration circuit 8 are introduced into the comparator 9 to determine whether or not the levels of the output signals from the integration circuit 8 are more than a predetermined value enough to provide a sufficient coloration shade of the electrochromic material. If the levels of the output signals of the integration circuit 8 are below the predetermined value, the comparator 9 develops output signals applied to the controller 10. Then the driver 11 generates the driving signals entered into the ECD 6 for the purpose of constant voltage driving techniques. The ECD 6 indicates display by the coloration of the electrochromic material therein.

When the levels of the output signals from the integration circuit 8 reach the predetermined value, the comparator 9 does not provide the output signals so that the driver 11 does not activate the ECD 6 anymore.

Figure 7:
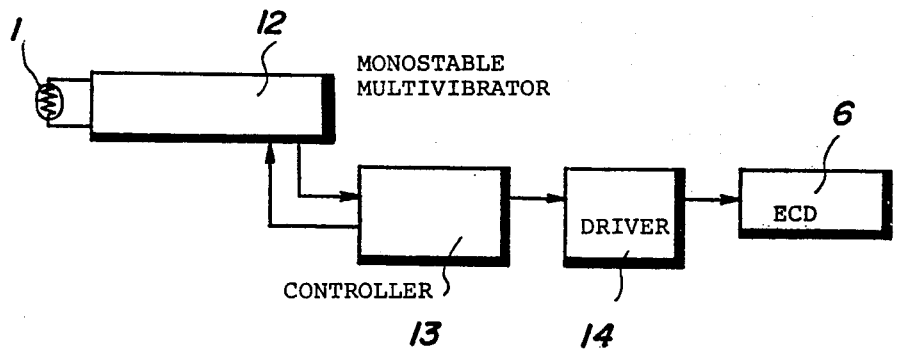
FIG. 7 is a block diagram of still another specific coloration uniforming circuit according to the present invention.

FIG. 7 shows still another coloration uniforming circuit of a further embodiment of the present invention. The coloration uniforming circuit of FIG. 7 comprises the above-mentioned thermally responsive element 1, a monostable multivibrator 12, a controller 13, a driver 14, and the ECD 6. The controller 13 and the driver 14 are similar to the above-mentioned controller 4 and the driver 5, as described with respect to FIG. 1.

The monostable multivibrator 12 is provided for controlling the activation of the ECD 6 in accordance with unstable and stable conditions. A more detailed circuit construction of the monostable multivibrator 12 is shown in FIG. 8, for example.

The heat-sensitive element 1 is connected to portions of the monostable multivibrator 12.

Figures 8, 9:
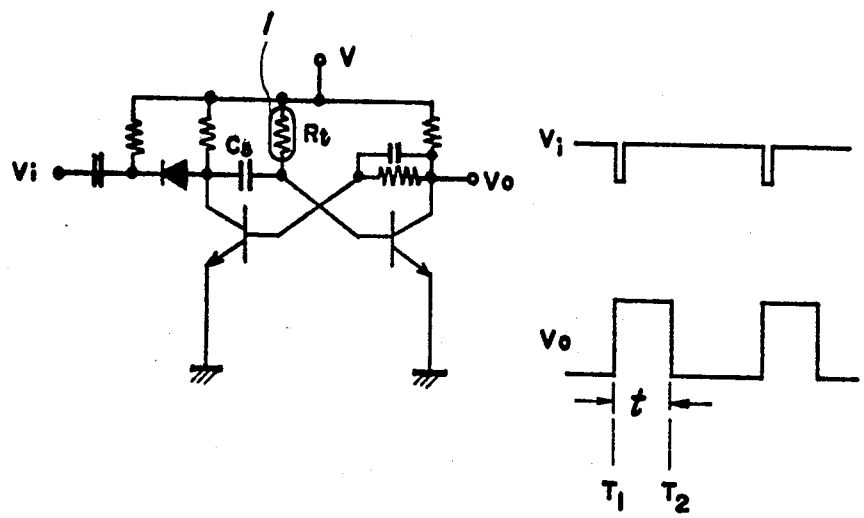
FIG. 8 is a more detailed circuit configuration of parts of the coloration uniforming circuit shown in FIG. 7.
FIG. 9 is a time chart of signals occurring within the circuit illustrated in FIG. 8.

An input terminal Vi of the monostable multivibrator 12 accepts trigger pulse signals as shown in FIG. 9 at a timing T1. The multivibrator 12 is placed in unstable conditions so that output signals of a high level appear on an output terminal Vo. In response to the output signals from the monostable multivibrator 12, the controller 13 develops output signals applied to the driver 14 so that the ECD 6 is activated in the constant voltage driving techniques.

The following equation can represent time periods t for which the output signals appearing on the output terminal Vo are maintained at the high level:

$$t = C_B R_t \log_e 2$$

where $C_B$: a capacity of a condenser of the monostable multivibrator 12

$R_t$: a resistance value of the thermally responsive element 1

The time periods t are directly proportional to the resistance value of the heat-sensitive element 1, the value depending on temperature. Pursuant to the resistance value of the element 1 independent on temperature, the monostable multivibrator 12 is placed in stable conditions so that the controller 13 does not allow the driver 14 to energize the ECD 6 anymore. The coloration shade of the electrochromic material of the ECD 6 can be uniformed since the driver 14 is controlled according to the surrounding temperature through the use of the variation of the time periods t as to the unstable conditions of the monostable multivibrator 12.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A driving circuit for developing driving signals to drive an electro-optical device, said device including an optical element, said element being colored in response to said driving signals, the coloration of said element depending on the surrounding temperature, said driving circuit comprising:

monitoring means for monitoring variations in the surrounding temperature; and controlling means responsive to the monitoring means for controlling the time interval of application of the driving signals being applied to the electro-optical device in accordance with the variations in the surrounding temperature monitored by the monitoring means; whereby a single, uniform depth of color of the optical element is maintained regardless of the variations in the surrounding temperature monitored by the monitoring means.

2. The driving circuit according to claim 1, wherein the optical element comprises an electrochromic material, the electro optical device being an electrochromic display.

3. The driving circuit according to claim 1, wherein the monitoring means comprises thermister means.

4. The driving circuit according to claim 2, wherein the coloration properties of the electrochromic material are changed in accordance with the parameter defined by:

$$e^{(\alpha/T)}$$

where
α: a constant of about 1,500 to 1,900
T: a value of absolute temperature.

5. The driving circuit according to claim 1, wherein the monitoring means comprises:

a heat-sensitive element;

converter means responsive to the heat-sensitive element for providing information corresponding to the variations in the surrounding temperature;

counter means responsive to the converter means for providing a count starting from a predetermined value, the value being supplied in accordance with the information provided by said converter means;

a first gate means responsive to the count provided by said counter means for controlling the driving circuit; and a second gate means responsive to the first gate means for subsequently advancing the counter means;

whereby the length of the count provided by the counter means is determined by the predetermined value and establishes the time interval of application of said driving signals being applied to the electro-optical device, the controlled time interval of the driving signals maintaining a single, uniform depth of color on said optical element.

6. The driving circuit according to claim 1, wherein the monitoring means comprises, a heat-sensitive element, first circuit means responsive to the heat-sensitive element for generating information corresponding to the variation of the surrounding temperature, second circuit means responsive to the information generated by the first circuit means for performing an integration calculation on the base of the information, comparator means responsive to the second circuit means for determining whether the results of the integration calculation coincides with a preset value, said value corresponding to a uniform coloration shade of the optical element and developing output signals in response to the coincidence therebetween, and third circuit means responsive to the comparator means for controlling the driving circuit in accordance with the output signals from the comparator means.

7. The driving circuit according to claim 1, wherein the monitoring means comprises, a heat-sensitive element, and first circuit means responsive to the heat-sensitive element for providing output signals having an applied time interval, said time interval corresponding to the value of the temperature coefficient to the heat-sensitive element.

8. The driving circuit according to claim 7, wherein the first circuit comprises a monostable multivibrator.

9. The driving circuit according to claim 1, wherein the controlling means maintains the voltage level of the driving signals applied to the electro-optical device approximately constant.

* * * * *